…

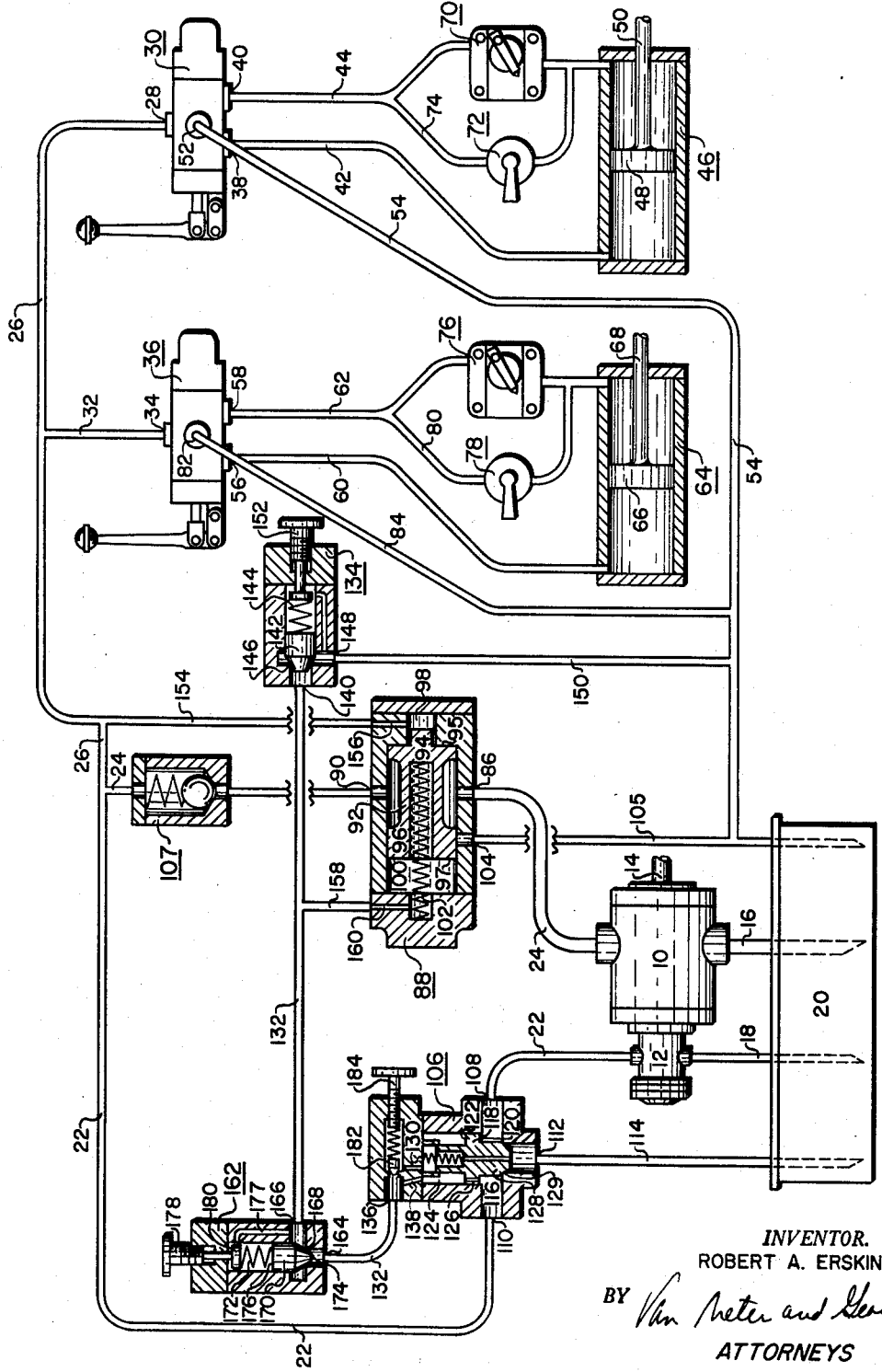

United States Patent Office 2,932,167
Patented Apr. 12, 1960

2,932,167

POWER TRANSMISSION

Robert A. Erskine, Metamora, Mich., assignor to Vickers Incorporated, Detroit, Mich., a corporation of Michigan Application March 2, 1959, Serial No. 796,422

14 Claims. (Cl. 60—52)

This invention relates to power transmissions, and is particularly applicable to those of the type comprising two or more fluid pressure energy translating devices, one of which may function as a pump and another as a fluid motor.

The invention is generally concerned with hydraulic power transmission control systems and more particularly as used in various machine tools to drive the tool or work carriages thereof.

Control systems for machine tools providing the usual rapid traverse and feed rate have become standardized and are readily obtainable. One of such systems utilizes a pair of positive displacement fluid pumps mechanically coupled to a prime mover, and the separate delivery conduits of each pump lead to a main delivery conduit which may be selectively connected to opposite ends of a fluid motor or motors for driving the work carriage or machine tool load devices. Valving is utilized which permits both pumps to deliver their displacement at low pressure to produce the traverse movement and at a relatively higher pressure to unload the pump having the larger displacement back to a tank. The smaller displacement pump continues to deliver into the delivery conduit at a relatively higher pressure to produce the feed movement. A system of the type recited is disclosed in the patent to Vickers, No. 1,982,711. A flow control valve is incorporated in the circuit in the line adapted to return fluid from the motor during a feed operation and which may be bypassed during the traverse movement. A pressure relief valve is also utilized to exhaust to the tank fluid from the smaller displacement pump in excess of the flow regulating valve setting as determined by the feed requirements of the system.

In systems of the type mentioned, the unloading valve for the large displacement pump and the pressure relief valve for bypassing a portion of the displacement of the small pump in excess of feed requirements are separately adjustable for determining the unloading and system feed pressure settings. Thus with each valve separately adjustable, such systems occasionally become inefficient and inoperative, due to carelessness or ineptitude in making the adjustments. An improved control system adapted to prevent such misadjustment shortcoming is disclosed in the patent to E. O. Clark and M. R. Fox, No. 2,728,194, wherein separate adjustments for the individual unloading and feed pressure settings of the unloading and relief valve are eliminated, there being provided a circuit incorporating a single, adjustable, pressure responsive pilot control valve for controlling the operating pressure setting of both the unloading valve and the relief valve.

Although the improved system therein disclosed has the advantage of a single pilot control adjustment, it does not have the feature of the older type of system wherein an accurate predetermined differential could be established between the unloading of the large pump and the system feed pressure setting, provided of course that the separate pressure settings are originally, accurately adjusted. Also, under some pressure and volume displacement conditions, the improved system is devoid of assurance that the unloading valve will completely unload the large pump before the relief valve is actuated to bypass a portion of the small displacement pump because of the extremely small differential in the operating pressures of the unloading and relief valves.

It is therefore an object of this invention to provide an improved power transmission control system of the general type recited.

It is a further object of this invention to provide a power transmission control system, as recited, in which a single, pressure responsive, pilot control valve is utilized for controlling both the unloading valve and pressure relief valve and which also provides a substantially accurate predetermined operating pressure differential between the two valves.

It is another object of this invention to provide an improved power transmission control system, as recited, which is adapted to assure complete operation of the unloading valve before operation of the bypass valve for the smaller displacement pump.

It is also an object of this invention to provide an improved power control transmission system of the type recited which is economical, accurate, and which will be operable over a long and useful life.

Further objects and advantages of the present invention will be apparent in the following description, reference being had to the accompanying drawing wherein a preferred form of the present invention is clearly shown.

In the drawing:

In the drawing, the single figure is a diagrammatic view of a hydraulic power transmission system embodying a preferred form of the present invention.

Referring now to the single figure, there is shown two positive but dissimilar displacement fluid pumps 10 and 12 which may be mechanically coupled at 14 to a prime mover, not shown, such as an electric motor. The pumps 10 and 12 are respectively connected by inlet supply conduits 16 and 18 to a supply tank 20. The pump 12 has connected thereto a delivery conduit 22, and the pump 10 has a delivery conduit 24 connected thereto which lead to a main pressure delivery conduit, which is indicated by the numeral 26 beyond the intersection of delivery conduit 24 with the delivery conduit 22. The main delivery conduit 26 is connected to the pressure port 28 of a convential, manually operated 4-way directional control valve 30 and is connected by a branch conduit 32 to the pressure port 34 of a similar manually operated, directional control valve 36. The motor ports 38 and 40 of the directional control valve 30 are respectively connected by conduits 42 and 44 to the head and rod ends of a fluid motor 46 having a piston 48 reciprocally mounted therein, associated with which is a piston rod 50 extending from the motor for driving a working tool load device such as a multiple drill. A tank port 52 of the directional control valve 30 is connected to the tank 20 by a return or tank conduit 54. The motor ports 56 and 58 of the directional control valve 36 are respectively connected by motor conduits 60 and 62 to the head and rod ends of a fluid motor 64 having a piston 66 reciprocally mounted therein, associated with which is a piston rod 68 extending from the motor for driving a working tool load device such as another multiple drill.

As the directional control valves 30 and 36 are of conventional structure and their function and operation are well-known, only a general description of their operation is given. Both directional control valves are of the closed center type which, in the position of the manually operated levers shown, close communication between all ports of the valve. When either control handle is shifted rightwardly from the position shown, the main delivery conduit will be connected to the head end of the fluid motor associated therewith, and the rod end thereof will be connected to the tank 20. When the control handles are shifted leftwardly from the position shown, the main delivery conduit 26 will be connected to the rod ends of the fluid motors, and the head ends of the motors will be connected to the tank 20.

Incorporated in the motor conduit 44, which is connected to the rod end of motor 46, is a flow control valve indicated generally by the numeral 70 for producing a feed movement of the motor 46, when the main delivery conduit 26 is connected to the head end of the motor and, when a mechanically operated bypass valve 72 in a branch line 74 of the motor conduit 44 is closed. Flow control valves of this type are well-known in the prior art and comprise a throttle and pressure compensating valve for maintaining the flow across the throttle constant according to the setting of the throttle. When the bypass valve 72 is closed, fluid displacement from the rod end of the motor must flow through the flow control valve for producing the feed movement of the motor. When the bypass valve 72 is open, the speed of the motor is uncontrolled. Reference may be made to the patent to H. F. Vickers, 1,982,711, which discloses the flow control valve structure and which describes the operation of valves of this type. Incorporated in the motor conduit 62, which is connected to the rod end of motor 64, is a similar flow control valve 76; and a similar bypass valve 78 is incorporated in a branch conduit 80 of the motor conduit 62 which performs the same function as bypass valve 72. The directional control valve 36 is provided with a tank port 82 which is connected by a return or tank conduit 84 to the tank conduit 54 leading to the tank 20.

The delivery conduit 24 of the larger displacement pump 10 is connected to the inlet port 86 of a pressure responsive bypass or unloading valve 88 for unloading the delivery of pump 10 and is also connected to an outlet port 90 thereof. The unloading valve 88 is of the substantially balanced type comprising a housing within which is shiftably mounted a spool valve 92 having extreme end lands 94 and 96, including pressure responsive surface areas 95 and 97 respectively exposed to pressures in end chambers 98 and 100. The spool 92 is biased to the loaded position shown by a spring 102 so that fluid from the large pump 10 flowing in the conduit 24 is free to flow through the housing between the lands of the valve spool from the inlet port 86 to the outlet port 90, the land 96 closing communication between the inlet port 86 and a bypass port 104, which is connected to the tank by a conduit 105. Because of the opposed substantially balanced, pressure responsive surface areas 95 and 97 of the lands 94 and 96, the valve spool 92 will only be shifted from the closed position shown when there is a differential of pressure existing on the opposed pressure responsive surface areas in chambers 98 and 100, which is greater than the resistance of spring 102. This is accomplished by venting chamber 100 as later explained.

A check valve 107 is incorporated in the delivery conduit 24 of the large pump 10 beyond the unloading valve outlet port 90, which permits the delivery of the large pump to be combined with the delivery of the smaller pump 12 and prevents flow from the smaller pump to the larger pump. The check valve 107 will be maintained in the closed position by the delivery pressure of pump 12 conducted to the closing side thereof, when the unloading valve spool 92 is operated to the open position. The delivery of pump 10 is then unloaded at negligible pressure to the tank 20 through the unloading valve 88.

Incorporated in the delivery conduit 22 of the smaller displacement pump 12 is a bypass or pressure responsive relief valve, indicated generally by the numeral 106, having both its inlet and outlet ports 108 and 110 connected to the delivery conduit 22. The bypass valve 106 is adapted to exhaust to tank a portion of the delivery of pump 12 in excess of motor feed requirements. For this purpose the bypass valve 106 is provided with a bypass port 112 connected to the tank 20 by means of a conduit 114. The inlet and outlet ports 108 and 110 are connected to an inlet chamber 116 within which the under surface 118 of an operating piston 120 is exposed. The opposed upper surface 122 of the piston 120 is exposed to pressure in a control chamber 124, the inner chamber 116 being connected to the control chamber 124 by a restricted passage 126 in the piston 120. The piston 120 carries a spool, the lower end of which is provided with a valve 128 which normally closes a seat opening 129 connected to the bypass port 112. The spool and valve carried by the piston are biased to the closed position shown by a spring 130 of predetermined resistance. The opposing surfaces 118 and 122 of the piston 120 are slightly unbalanced with the effective area of surface 122 in control chamber 124 being slightly larger. Until the control chamber 124 is vented in a manner to create a differential of pressure on the opposed piston surfaces greater than the resistance of spring 130, the spring will maintain the valve 128 in the closed position shown.

Referring now to the control circuit portion of the system for operating the bypass valves 88 and 106, both the control chamber 124 of the bypass valve 106 and the chamber 100 of bypass valve 88 are connected to a control conduit 132 or vent path in which is incorporated a pressure responsive pilot control or vent valve, indicated generally by the numeral 134. Conduit 132 is connected at one end to a control port 136 of bypass valve 106, the port 136 being connected to the control chamber 124 of valve 106 by an internal passage 138. The conduit 132 is connected at its opposite end to the pressure inlet port 140 of pilot control valve 134.

Mounted within the housing of vent valve 134 is a poppet valve 142 which is biased by a spring 144 on a seat 146 so as to close communication between the pressure inlet port 140 and a bypass port 148, the latter of which is connected to the tank line 54 by a conduit 150. An adjustment member, indicated generally by the numeral 152, engages the spring 144 for adjusting the resistance thereof to determine the unloading setting of the large pump 10. A branch passage 154 of main delivery conduit 26 is connected to a chamber inlet passage 156 of bypass valve 88, the inlet passage 156 leading to the chamber 98 so as to expose the pressure responsive surface 95 of the land 94 in the chamber 98 to the pressure existing in the main delivery conduit 26. A branch passage 158 of the control conduit or vent path 132 is connected to another chamber inlet passage 160 at the opposite end of bypass valve 88, which leads to chamber 100 so as to expose the pressure responsive surface 97 of land 96 in chamber 100 to the pressure existing in the control conduit 132 beyond a resistance valve 162.

The resistance valve 162, in the form disclosed, is of conventional check valve structure, and is adapted to provide a predetermined differential between the operating pressures of the bypass valves 88 and 106 and assure complete operation of the bypass valve 88 before operation of the bypass valve 106. The resistance valve 162 has an inlet port 164 and an outlet port 166 which are interconnected by a seat 168 upon which is resiliently biased a poppet valve 170 through the medium of the spring 172. Pressure fluid at the inlet port 164 imposed against a pressure responsive surface 174 of the poppet valve 170 tends to open the valve, while pressure fluid in the control conduit 132 at the outlet port 166 imposed against an opposing surface 176 of the poppet valve tends to close the valve. The outlet port 166 is connected to surface 176 by a passage 177. The resistance of spring 172 may be increased by an adjusting member, indicated generally by the numeral 178, threadable into the housing of valve 162 so as to shift a retainer 180 abutting one end of the spring 172.

For many applications no adjustment of the spring 172 will be necessary as the resistance of the spring 172 mounted in the housing of valve 162 may be selected to provide a differential of operating pressure between the two bypass valves suitable for many system applications. If a lower or higher operating pressure differential between the two bypass valves is required, a spring for causing the desired differential may be substituted for the general purpose spring. However, there are applications where it is desired to change the operating differential; and also the adjustable valve may be kept in stock, as a spare part, to meet a variety of system applications. The important feature, however, as will later and hereinafter be described, is that the resistance valve without adjustment does provide an assured minimum operating pressure differential between the two bypass valves and assures complete operation of the unloading valve before operation of the bypass valve for the smaller displacement pump.

The bypass or pressure relief valve 106 is disclosed as having mounted therein a pilot control valve 182 provided with an adjustment member 184 for regulating the pressure setting of the valve 182. The pilot control valve 182 forms no part of the present invention and may be omitted. When used, the adjusting member is adapted to set the spring load substantially higher than the highest system operating pressure required and will only come into operation in case of failure, which is extremely remote, of the pilot control vent valve 134 in the control conduit to open. Thus, its only purpose is to serve as an auxiliary or secondary pressure relief valve protection for the system.

Although both motors may be operated from the combined delivery of both pumps and either one or both of the motors operated in a feed movement from the displacement of the smaller pump, the operation of the system will be described with only one motor in operation for the purposes of convenience and clarity. Thus, if the control handle of directional valve 30 is shifted to the neutral position shown, all ports of the valve will be closed from communication with each other, and motor 46 will be maintained in the "stop" position.

In order to provide a rapid traverse movement of motor 64, the control handle of directional valve 36 is shifted leftwardly from the neutral position shown, and the combined delivery of pumps 10 and 12 will be conducted by main delivery conduit 26 to the pressure port of directional control valve 36 and thence to the rod end of motor 64 by means of conduits 62 and branch bypass conduit 80, the bypass valve 78 being open for this purpose. Fluid displacement from the head end of motor 64 will be conducted by conduit 60 to the directional control valve 36 and thence by means of conduits 84, 54 and 105 to the tank 20. Because the rapid traverse movement is accomplished at relatively low pressure, the bypass valves 88 and 106 remain closed, and the combined delivery of pumps 10 and 12 is utilized for providing rapid operation.

When the motor 64 has completed its rapid traverse movement, the control handle of directional control valve 36 is shifted rightwardly from the neutral position shown, and the feed movement may begin immediately or after a slight rapid operation of the motor for moving the working tool towards the work. The feed movement will begin, however, when the bypass valve 78 is closed for causing fluid displacement from the rod end of the motor to flow through the flow control valve 76. During the motor feed stage of operation the main delivery conduit 26 is connected by the directional control valve 36 to the motor conduit 60 and, with the bypass valve 78 closed, the rod end of the motor 64 is connected to the directional control valve by means of conduit 62 from whence the regulated displacement from the motor flows back to tank by means of conduits 84, 54 and 105. Displacement from the smaller pump in excess of the feed requirement is adapted to exhaust to tank 20 by means of the bypass valve 106. Prior to the operation of valve 106, however, valve 88 will have been operated so as to completely unload the full displacement of pump 10 to the tank 20. This is accomplished in the following manner:

When the feed movement begins, the pressure build-up ahead of flow control valve 76 in conduit 62 is reflected in the main delivery conduit 26 and is transmitted by branch conduit 154 and inlet passage 156 of unloading valve 88 to the chamber 98 for imposing the same against the pressure responsive surface 95 of land 94. At the same time, pressure existing in main delivery conduit 26 is also transmitted through the delivery conduit 22 of the smaller displacement pump 12 to the inlet chamber 116 of bypass valve 106 and also by means of restriction 126 in the piston 120 to the control chamber 124, and thence by means of passage 138 and control port 136 of valve 106 to the conduit 132. In order for either bypass valve 88 or 106 to be operated, a differential of operating pressure must be created in the chambers containing their respective opposed, pressure responsive operation surfaces greater than the load of the resilient means of each maintaining the valves to the closed position. This differential of operating pressure can be obtained by opening up the vent path for the bypass valves. Poppet valve 170 of resistance valve 162 will remain closed temporarily because of at least control pressure, as determined by the setting of pilot valve 134, being imposed on the pressure responsive surface 176 of poppet valve 170 and because the spring resistance 172 of the valve 170 is greater than the resistance of spring 102 of the unloading valve spool 92. The vent path for the bypass valve 106 thus temporarily remains closed. Until the unloading valve spool 92 is shifted, the combined pressure load in conduit 132 and load resistance of spring 172 is greater than the pressure in conduit 132 between control port 136 of bypass valve 106 and resistance valve 162 imposed against the pressure operating surface 174 of poppet valve 170. Consequently, with resistance valve 162 closed, there will be no opened vent path and thus no differential of operating pressure on the opposed operation surfaces of piston 120 of bypass valve 106, the poppet valve 128 within such valve remaining seated. When the pressure in conduit 26, which is transmitted by branch conduit 154 to the inlet chamber 98 of valve 88, reaches an amount slightly over the spring setting of pilot control vent valve 134 plus the resistance of unloading valve spring 102, the unloading valve spool 92 will be shifted leftwardly so as to cause the displacement from chamber 100 of said valve to be conducted by branch passage 158 and control conduit 132 to shift poppet valve 142 within vent valve 134 to the open position. The pressure fluid delivery in the combined delivery conduit 26, which is conducted by branch passage 154 to chamber 98, causes the unloading valve spool 92 to be shifted completely leftwardly; and the valve spool 92 will be maintained in said position for permitting the complete displacement of pump 10 to be unloaded to the tank 20 by means of delivery conduit 24, unloading valve inlet port 86, the bypass port 104 and conduit 105. The pressure in conduit 26 continues to rise because the full delivery of pump 12 is in excess of the feed requirements of motor 64 and, as the pressure in the previously closed control conduit or vent path 132 between the resistance valve 162 and pilot control valve 134 is prevented from exceeding the control setting of said valve, a pressure increase takes place in conduit 132 leading from the control port 136 of bypass valve 106, which is greater than the combined pressure load in conduit 132 and the spring load resistance of resistance valve 162, thereby opening the poppet valve 170 so as to connect the delivery line 22 of pump 12 through the open poppet valve seat 174 to the vent valve 134 to keep open the pilot control poppet valve 142. When both the poppet valve 170 of resistance valve 162 and poppet valve 142 of vent valve 134 are opened, flow is created across the restriction 126 of the piston 120, which creates a differential of operating pressure in the inlet chamber 116 and control chamber 124 of the bypass valve 106 greater than the resistance of the spring 130; and the piston 120 is shifted upwardly together with the poppet valve 128 to connect the delivery conduit 22 through the open seat 129 and conduit 114 to the tank 20. Only an amount of fluid displacement from the pump 12 is bypassed over the open poppet valve 128 of bypass valve 106 in excess of the feed requirements of motor 64, which is determined by the setting of the throttle within flow control valve 76. A slight amount of the delivery of the pump 12 is continuously exhausted over the opened pilot control valve 134, and the feed of motor 64 continues at a pressure equal to the setting of control valve 134 plus the drop in pressure across the open poppet valve 170 of resistance valve 162. Pressure in the conduit 22 is transmitted to the delivery conduit 24 to maintain the check valve 104 in the delivery conduit 24 closed.

When the feed movement of motor 64 has been completed, the control valve handle of the valve is shifted leftwardly, and the bypass valve 78 in branch conduit 80 of conduit 62 is opened to provide a rapid traverse movement of the motor. With a drop in pressure in the system because of the low pressure requirement for rapid traverse, the operation of the bypass valves 88 and 106 to their closed positions will be reversed from that of their operation to their bypassing positions. The pilot control valve 134 is spring actuated to the closed position, and with no flow across the restriction 126 of piston 120 of bypass valve 106, the operating pressure differential across the piston is dissipated so that the spring 130 operates the piston and poppet valve 128 carried thereby to the closed position. The pressure differential formerly existing in the chambers 98 and 100 of unloading of bypass valve 88 is also dissipated, because the drop in pressure in conduit 26 transmitted by branch conduit 154 to chamber 98 and the spring 102 operates the spool 92 to the closed position illustrated. With both bypass valves 88 and 106 closed, the combined delivery of pumps 10 and 12 is conducted by conduits 24 and 22 to the main delivery conduit 26 for providing the rapid traverse operation of the motor.

There is therefore provided a dual pump system utilizing two bypass valves for separately unloading one pump and controlling the system feed of the other pump, the bypass valves being controlled by a single pressure responsive pilot control or vent valve in a control circuit incorporating means for assuring unloading of one pump and a desired differential in operating pressure between the bypass valves. This is accomplished by the incorporation of a resistance valve in the control circuit or vent path ahead of the vent valve, which assures a differential in operating pressure no matter what the adjustment of the vent valve, and also assures complete operation of the unloading bypass valve.

In addition, the resistance valve may be adjusted to increase the operating pressure differential between the two bypass valves. Also all of the valves utilized are of conventional structure and need not be especially designed to perform the functions and obtain the results desired.

While the form of embodiment of the invention as herein disclosed constitutes a preferred form, it is to be understood that other forms might be adopted, all coming within the scope of the claims which follow.

What is claimed is as follows:

1. In a hydraulic power transmission having a pair of pumps parallelly connected to a load, a separate bypass for each pump, a valve controlling each bypass, a pair of pressure chambers associated with each one of said valves and so oriented as to impose force in the closing direction on its associated valve, that improvement comprising: means forming a vent path for one of said chambers, said vent path having interposed in series therein a pair of pressure responsive control valves; and a vent path for the other of said chambers, said vent path having interposed therein only one of said pair of pressure responsive control valves.

2. In a hydraulic power transmission system having a pair of fluid pumps hydraulically connected in parallel to a load device and a separate bypass valve for each pump of the type having opposed operating surfaces, one of which is exposed to pressure in a chamber imposing a closing force on said valve, that improvement comprising: a pressure responsive vent valve directly connected to one chamber; and a normally closed valve in series with the vent valve connected to the other chamber, said normally closed valve being operable to the open position at a pressure higher than the operating pressure of the bypass valve directly connected to the vent valve.

3. In a hydraulic power transmission system having a pair of fluid pumps hydraulically connected in parallel to a load device and a separate bypass valve for each pump of the type having opposed operating surfaces, one of which is exposed to pressure in a chamber imposing a closing force on said valve, that improvement comprising: a control conduit connected to both chambers; and two normally closed, pressure responsive valves connected in series in said conduit, the second of which is a vent valve, said chambers being respectively connected to the conduit ahead of and beyond the first of said normally closed valves.

4. In a hydraulic power transmission system having a pair of fluid pumps hydraulically connected in parallel to a load device and a separate bypass valve for each pump of the type having opposed operating surfaces, one of which is exposed to pressure in a chamber imposing a closing force on said valve, that improvement comprising: a pressure responsive vent valve directly connected to one chamber; a normally closed valve in series with the vent valve connected to the other chamber, said normally closed valve being operable to the open position at a pressure higher than the operating pressure of the bypass valve directly connected to the vent valve; and means for varying the operating pressure setting of the normally closed valve for varying the operating pressure differential of the two bypass valves.

5. In a hydraulic power transmission system having a pair of fluid pumps hydraulically connected in parallel to a load device and a separate bypass valve for each pump of the type having opposed operating surfaces, one of which is exposed to pressure in a chamber imposing a closing force on said valve, that improvement comprising: a pressure responsive vent valve directly connected to one chamber; a normally closed valve in series with the vent valve connected to the other chamber, said normally closed valve being operable to the open position at a pressure higher than the operating pressure of the bypass valve directly connected to the vent valve; means for varying the operating pressure setting of the vent valve for varying the operating pressure setting of one of the bypass valves; and means for varying the operating pressure setting of the normally closed valve for varying the operating pressure differential of the two bypass valves.

6. In a hydraulic power transmission system having a pair of fluid pumps hydraulically connected in parallel to a load device and a separate bypass valve for each pump of the type having opposed operating surfaces, one of which is exposed to pressure in a chamber imposing a closing force on said valve, that improvement comprising: a pressure responsive vent valve directly connected to one chamber, operable to vent the said chamber of said bypass valve at a predetermined combined delivery pressure of the pumps; and a normally closed valve in series with the vent valve connected to the other chamber, said normally closed valve being operable to the open position at a delivery pressure of the pump associated with the other bypass valve greater than the operating pressure of the said one bypass valve.

7. In a hydraulic power transmission system: a pair of fluid pumps hydraulically connected in parallel to a delivery line for driving a load device; an unloading valve for the delivery of one pump and a bypass valve for the delivery of the other pump, both valves having opposed operating surfaces including a pressure chamber for one operating surface of each valve adapted to impose a closing force on the valve; a circuit connecting the delivery line to the opposed operating surfaces of the bypass valve and to the operating surface of the unloading valve imposing an opening force thereon; a vent valve connected to the unoloading valve chamber actuable to vent said chamber at a predetermined pressure in the delivery line; and a normally closed valve in series with the vent valve connected to the bypass valve chamber, said normally closed valve being operable to the open position at a delivery line pressure greater than the delivery line operating pressure of the unloading valve.

8. In a hydraulic power transmission system: a pair of fluid pumps hydraulically connected in parallel to a delivery line for driving a load device; an unloading valve for the delivery of one pump and a bypass valve for the delivery of the other pump, both valves having operating surfaces including a pressure chamber for one operating surface of each valve adapted to impose a closing force on the valve; a circuit connecting the delivery line to the opposed operating surfaces of the bypass valve and to the operating surface of the unloading valve imposing an opening force thereon; a vent valve connected to the unloading valve chamber actuable to vent said chamber at a predetermined pressure in the delivery line; a normally closed pressure responsive valve in series with the vent valve connected to the bypass valve chamber; and means for adjusting the vent valve to vary the operating pressure setting of the unloading valve, said normally closed valve providing a differential in the operating pressures of the unloading and bypass valves no matter what the setting of the vent valve.

9. In a hydraulic power transmission system: a pair of fluid pumps hydraulically connected in parallel to a delivery line for driving a load device; an unloading valve for the delivery of one pump and a bypass valve for the delivery of the other pump, both valves having operating surfaces including a pressure chamber for one operating surface of each valve adapted to impose a closing force on the valve; a circuit connecting the delivery line to the opposed operating surfaces of the bypass valve and to the operating surface of the unloading valve imposing an opening force thereon; a vent valve connected to the unloading valve chamber actuable to vent said chamber at a predetermined pressure in the delivery line; a normally closed pressure responsive valve in series with the vent valve connected to the bypass valve chamber; means for adjusting the vent valve to vary the operating pressure setting of the unloading valve, said normally closed valve providing a differential in the operating pressures of the unloading and bypass valves no matter what the setting of the vent valve; and means for varying the operating pressure setting of the normally closed valve for varying the differential between the operating pressures of the unloading and bypass valves.

10. In a hydraulic power transmission system: a pair of fluid pumps hydraulically connected in parallel to a delivery line for driving a load device; an unloading valve for the delivery of one pump and a bypass valve for the delivery of the other pump, both valves having opposed operating surfaces including a pressure chamber for one operating surface of each valve adapted to impose a closing force on the valve; a circuit connecting the delivery line to the opposed operating surfaces of the bypass valve and to the operating surface of the unloading valve imposing an opening force thereon; a vent valve connected to the unloading valve chamber actuable to vent said chamber at a predetermined pressure in the delivery line; a normally closed pressure responsive valve in series with the vent valve connected to the bypass valve chamber, said normally closed valve being operable to the open positon at a delivery line pressure greater than the delivery line operating pressure of the unloading valve for providing a differential in the operating pressures of the unloading and bypass valves; and means for adjusting the operating pressure setting of the normally closed valve for increasing the differential between the said operating pressures.

11. In a hydraulic power transmission system including a pair of fluid pumps hydraulically connected in parallel to a fluid motor for driving the same, the combination of: a separate bypass valve for each pump of the opposed operating surface type and actuatable to the open position by an operating pressure differential; a pilot control valve responsive at a predetermined combined delivery pressure of said pumps to establish an operating pressure differential for one of said valves; and normally closed valve means responsive at a delivery pressure of the pump associated with the other of said bypass valves greater than the said combined delivery pressure of said pumps for causing said pilot control valve to be effective for establishing an operating pressure differential for the said other bypass valve.

12. In a hydraulic power transmission system including a pair of fluid pumps hydraulically connected in parallel to a fluid motor for driving the same, the combination of: a separate bypass valve for each pump of the opposed operating surface type and actuable to the open position by an operating pressure differential; a pilot control valve responsive at a predetermined combined delivery pressure of said pumps to establish an operating pressure differential for one of said valves; normally closed valve means responsive at a delivery pressure of the pump associated with the other of said bypass valves greater than the said combined delivery pressure of said pumps for causing said pilot control valve to be effective for establishing an operating pressure differential for the said other bypass valve; and means for adjusting the pressure setting of the normally closed valve means for varying the differential between the operating pressures of the two bypass valves.

13. In a hydraulic power transmission system including a pair of fluid pumps hydraulically connected in parallel to a fluid motor for driving the same, the combination of: a separate bypass valve for each pump of the opposed operating surface type and actuable to the open position by an operating pressure differential; a control conduit connected to both bypass valves; a pilot control valve in said conduit responsive at a predetermined combined delivery pressure of said pumps to establish an operating pressure differential for actuating one of said valves; and valve means responsive at a delivery pressure of the pump associated with the other of said bypass valves greater than the said combined delivery pressure of said pumps for causing said pilot control valve to be effective for establishing an operating pressure differential for actuating the other bypass valve.

14. In a hydraulic power transmission system including a pair of fluid pumps hydraulically connected in parallel to a fluid motor for driving the same, the combination of: a separate bypass valve for each pump of the opposed operating surface type and actuable to the open position by an operating pressure differential; a control conduit connected to both bypass valves; a pilot control valve in said conduit responsive at a predetermined combined delivery pressure of said pumps to establish an operating pressure differential for actuating one of said valves; and normally closed valve means in series with and ahead of the pilot control valve in the control conduit responsive at a delivery pressure of the pump associated with the other of said bypass valves greater than the said combined delivery pressure of said pumps for causing said pilot control valve to be effective for establishing an operating pressure differential for actuating the other bypass valve.

References Cited in the file of this patent

UNITED STATES PATENTS

| | | |
|---|---|---|
| 1,982,711 | Vickers | Dec. 4, 1934 |
| 2,728,194 | Clark et al. | Dec. 27, 1955 |